(12) United States Patent
Dahl

(10) Patent No.: US 6,321,201 B1
(45) Date of Patent: *Nov. 20, 2001

(54) DATA SECURITY SYSTEM FOR A DATABASE HAVING MULTIPLE ENCRYPTION LEVELS APPLICABLE ON A DATA ELEMENT VALUE LEVEL

(75) Inventor: Ulf Dahl, Old Greenwich, CT (US)

(73) Assignee: Anonymity Protection in Sweden AB, Gothenburg (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,585

(22) Filed: Feb. 23, 1998

Related U.S. Application Data

(63) Continuation of application No. PCT/SE97/01089, filed on Jun. 18, 1997.

(30) Foreign Application Priority Data

Jun. 20, 1996 (SE) .................................................. 9602475

(51) Int. Cl.⁷ ..................................................... G06F 17/60
(52) U.S. Cl. ..................................... 705/1; 705/51; 707/9
(58) Field of Search ........................... 380/4, 3; 707/104, 707/1, 9; 705/1, 50, 51, 54

(56) References Cited

U.S. PATENT DOCUMENTS

| | | | |
|---|---|---|---|
| 5,369,702 | 11/1994 | Shanton | 380/4 |
| 5,459,860 * | 10/1995 | Burnett et al. | |
| 5,659,614 * | 8/1997 | Bailey, III | |
| 5,661,799 * | 8/1997 | Nagel et al. | |
| 5,680,452 | 10/1997 | Shanton | 380/4 |
| 5,699,428 * | 12/1997 | McDonnal et al. | |
| 5,717,755 | 2/1998 | Shanton | 380/25 |
| 5,757,908 * | 5/1998 | Cooper et al. | |
| 5,768,276 * | 6/1998 | Diachina et al. | |
| 5,898,781 | 4/1999 | Shanton | 380/25 |
| 5,915,017 * | 6/1999 | Sung et al. | |
| 5,915,025 * | 6/1999 | Taguchi et al. | |
| 5,917,915 * | 6/1999 | Hirose | |
| 5,933,498 * | 8/1999 | Schneck et al. | 705/54 |
| 5,940,507 * | 8/1999 | Cane et al. | |
| 6,098,172 * | 8/2000 | Coss et al. | 713/201 |

FOREIGN PATENT DOCUMENTS

| | | | |
|---|---|---|---|
| 3-276936 * | 12/1991 | (JP) | 340/825.06 |
| 7-219900 * | 8/1995 | (JP) | |
| 93 11619 | 6/1993 | (WO) | |
| 95 15628 | 6/1995 | (WO) | |

OTHER PUBLICATIONS

Hooper et al: "Related databases: An Accountant's primer"; Management Accounting, Oct. 1996, v78, n4, pp. 48–53.*

* cited by examiner

Primary Examiner—Edward R. Cosimano

(57) ABSTRACT

A method and an apparatus for processing data provides protection for the data. The data is stored as encrypted data element values (DV) in records (P) in a first database (O-DB), each data element value being linked to a corresponding data element type (DT). In a second database (IAM-DB), a data element protection catalogue (DC) is stored, which for each individual data element type (DT) contains one or more protection attributes stating processing rules for data element values (DV), which in the first database (O-DB) are linked to the individual data element type (DT). In each user-initiated measure which aims at processing a given data element value (DV) in the first database (O-DB), a calling is initially sent to the data element protection catalogue for collecting the protection attribute/attributes associated with the corresponding data element types. The user's processing of the given data element value is controlled in conformity with the collected protection attribute/attributes.

17 Claims, 4 Drawing Sheets

Fig. 5

| Data element name | Encryption | Sorting-out code | Logging up to | Owner |
|---|---|---|---|---|
| Housing Allowance | No | 4   60 days | No | |
| Social Allowance | Yes | 60 days | Yes   951205 | Stig Svensson |

IAM-Data element directory-Operative environment

Social Allowance

Trusted processes
Pgma001 v0103
PgmB002 v0201

Save    Interrupt

Social Allowance

Certified operators
Financial manager E001
Controller              C004

Save    Interrupt

Operators

DATA SECURITY SYSTEM FOR A DATABASE HAVING MULTIPLE ENCRYPTION LEVELS APPLICABLE ON A DATA ELEMENT VALUE LEVEL

This application is a PCT continuation of PCT application no. PCT/SE97/01089 filed on Jun. 18, 1997, the entire contents of which are incorporated herein by reference, which designated the United States and on which priority is claimed under 35 U.S.C. § 120.

TECHNICAL FIELD

The present invention relates to the technical field of computer-aided information management, and concerns more specifically a method and an apparatus for data processing for accomplishing increased protection against unauthorized processing of data.

BACKGROUND ART

In the field of computer-aided information management, it is strongly required that the protection against unauthorized access of data registers be increased, especially against violation of the individual's personal integrity when setting up and keeping personal registers, i.e. registers containing information on individuals. In particular, there are regulations restricting and prohibiting the linking and matching of personal registers. Also in other fields, such as industry, banking, insurance, etc, improved protection is desired against unauthorized access to the tools, databases, applications etc. that are used for administration and storing of sensitive information.

WO95/15628, which has the same owner as the present application, discloses a method for storing data, which results in increased possibilities of linking and matching with no risk of reduced integrity. The method, which is illustrated schematically in FIGS. 1 and 2 on the enclosed drawing sheets, concerns storing of information comprising on the one hand an identifying piece of information or original identity OID, for instance personal code numbers Pcn and, on the other hand, descriptive information DI. The information OID+DI is stored as records P in a database O-DB according to the following principle:

Step 1 OID (Pcn) is encrypted by means of a first, preferably non-reversible algorithm ALGL to an update identity UID;

Step 2 UID is encrypted by means of a second, reversible algorithm ALG2 to a storage identity SID;

Step 3 SID and DI are stored as a record P in the database O-DB, SID serving as a record identifier;

Step 4 At predetermined times, an alteration of SID in all or selected records P is accomplished by SID of these records being decrypted by means of a decrypting algorithm ALG3 to UID, whereupon UID is encrypted by means of a modified second, reversible algorithm or ALG2' to a new storage identity SID', which is introduced as a new record identifier in the associated record P as replacement for previous SID. This results in a security-enhancing "floating" alteration of SID of the records.

For a closer description of the details and advantages of this encrypting and storing method, reference is made to WO95/15628, which is to be considered to constitute part of the present description. The storing principle according to steps 1–4 above is herein referred to as PTY, which is an abbreviation of the principal of PROTEGRITY which stands for "Protection and Integrity".

A detailed technical description of PTY is also supplied in the document "PROTEGRITY (ASIS) Study 2", Ver. 1.2, Mar. 1, 1996, by Leif Jonson. Also this document is to be considered to constitute part of the present description.

In the technical field at issue, so-called shell protections are today the predominant method of protection. Shell protection comprises on the one hand the external security (premises) and, on the other hand, an authorization check system ACS with user's passwords for controlling the access. ACS is used as shell protection for main frames, client/server systems and PC, but it does not give full protection and the information at issue can often relatively easily be subjected to unauthorized access. This protection has been found more and more unsatisfactory since, to an increasing extent, "sensitive" information is being stored, which must permit managing via distribution, storing and processing in dynamically changing environments, especially local distribution to personal computers. Concurrently with this development, the limits of the system will be more and more indistinct and the effect afforded by a shell protection deteriorates.

SUMMARY OF THE INVENTION

In view of that stated above, the object of the present invention is to provide an improved method for processing information, by means of which it is possible to increase the protection against unauthorized access to sensitive information.

A special object of the invention is to provide a technique for data processing or managing, which makes it possible for the person responsible for the system, the management of the organization etc. to easily establish and continuously adapt the user's possibility of processing stored information that is to be protected.

A further object of the invention is to provide a technique for data processing which offers protection against attempts at unauthorized data processing by means of non-accepted software.

One more object of the invention is to provide a technique for data processing according to the above-mentioned objects, which can be used in combination with the above-described PTY principle, for providing a safety system with an extremely high level of protection.

Thus, the invention provides a method for processing of data that is to be protected, comprising the measure of storing the data as encrypted data element values of records in a first database (O-DB), each data element value being linked to a corresponding data element type.

The inventive method is characterised by the following further measures:

storing in a second database (IAM-DB) a data element protection catalogue, which for each individual data element type contains one or more protection attributes stating processing rules for data element values, which in the first database are linked to the individual data element type, in each user-initiated measure aiming at processing of a given data element value in the first database, initially producing a compelling calling to the data element protection catalogue for collecting the protection attribute/attributes associated with the corresponding data element type, and compellingly controlling the processing of the given data element value in conformity with the collected protection attribute/attributes.

In the present application the following definitions are used:

"Processing" may include all kinds of measures which mean any form of reading, printing, altering, coding, moving, copying etc. of data that is to be protected by the inventive method.

"Data element type" identifies a specific category of data. For example, identification information (name and address) could be a particular data element type. Whereas, some descriptive information (social allowance) could be a different data element type, and other descriptive information could be yet another different data element type.

"Data element value" concerns a value which in a given record specifies a data element type.

"Record" concerns a number of data element values which belong together and which are linked to the respective data element types, optionally also including a record identifier, by means of which the record can be identified. Example:

|  | DATA ELEMENT TYPE | |
| --- | --- | --- |
| RECORD ID | SOCIAL ALLOWANCE | CAR |
| XXXX XXXXX | encrypted data element value | encrypted data element value |
| YYYY YYYYY | encrypted data element value | encrypted data element value |

"Protection attribute indicating rules of processing" may concern:
  data stored in the data element protection catalogue and providing complete information on the rule or rules applying to the processing of the corresponding data element, and/or
  data stored in the data element protection catalogue and requiring additional callings to information stored in some other place, which, optionally in combination with the protection attributes, states the processing rules involved.

"Collection of protection attributes" may concern:
  collection of the protection attributes in the form as stored in the data element protection catalogue, and/or
  collection of data recovered from the protection attributes, for instance by decryption thereof.

"Encryption" may concern any form of encryption, tricryption, conversion of coding of plain-text data to non-interpretable (encrypted) data, and is especially to concern also methods of conversion including hashing.

The inventive method offers a new type of protection, which differs essentially from the prior-art shell protection and which works on the cell or data element level. Each data element type used in the records in the first database is thus associated with one or more protection attributes, which are stored in a separate data element protection catalogue and which protection attributes state rules of how to process the corresponding data element values. It should be particularly noted that the calling to the data element protection catalogue is required, or in other words compelling. This means that in a system, in which the method according to the invention is implemented, a user, who for instance wants to read a certain data element value in a given record in the first database, by his attempt at access to the data element value automatically produces a system calling to the data element protection catalogue in the second database for collecting the protection attributes associated with the corresponding data element types. The continued processing procedure (reading of data element value) of the system is also controlled compellingly in accordance with the collected protection attribute/attributes applying to the corresponding data element types.

The term "data element protection catalogue" and the use thereof according to the invention must not be confused with the known term "active dictionary", which means that, in addition to an operative database, there is a special table indicating different definitions or choices for data element values in the operative database, for instance that a data element value "yellow" in terms of definition means a color code which is within a numeric interval stated in such a reference table.

Preferably, the processing rules stated by the protection attributes are inaccessible to the user, and the read or collected protection attributes are preferably used merely internally by the system for controlling the processing. A given user, who, for instance, wants to read information stored in the database regarding a certain individual, thus need not at all be aware of the fact that certain protection attributes have been activated and resulted in certain, sensitive information for this individual being excluded from the information that is made available on e.g. a display. Each user-initiated measure aiming at processing of data element values thus involves on the one hand a compelling calling to the data element protection catalogue and, on the other hand, a continued processing which is compellingly subjected to those processing rules that are stated by the protection attributes, and this may thus be accomplished without the user obtaining information on what rules control the processing at issue, and especially without the user having any possibility of having access to the rules.

By altering, adding and removing protection attributes in the data element protection catalogue, the person responsible for the system or an equivalent person may easily determine, for each individual data element type, the processing rules applying to data element values associated with the individual data element type and thus easily maintain a high and clear safety quality in the system.

According to the invention, it is thus the individual data element (date element type) and not the entire register that becomes the controlling unit for the way in which the organization, operator etc. responsible for the system has determined the level of quality, responsibility and safety regarding the management of information.

To obtain a high level of protection, the data element protection catalogue is preferably encrypted so as to prevent unauthorized access thereto.

As preferred protection attributes, the present invention provides the following possibilities, which, however, are to be considered an incomplete, exemplifying list:

1. Statement of what "strength" or "level" (for instance none, 1, 2 . . . ) of encryption is to be used for storing the corresponding data element values in the database. Different data element values within one and the same record may thus be encrypted with mutually different strength.
2. Statement of what "strength" or "level" (for instance none, 1, 2, . . . ) of encryption is to be used for the corresponding data element values if these are to be transmitted on a net.
3. Statement of program and/or versions of program that are authorised to be used for processing the corresponding data element values.
4. Statement of "owner" of the data element type. Different data element values within one and the same record can thus have different owners.
5. Statement of sorting-out rules for the corresponding data element values, for instance, statement of method and time for automatic removal of the corresponding data element values from the database.
6. Statement whether automatic logging is to be made when processing the corresponding data element values.

According to a specially preferred embodiment of the invention, the above-described PTY storing method is used for encryption of all data that is to be encrypted in both the database (i.e. the data element values) and the data element protection catalogue (i.e. the protection attributes). In the normal case where each record has a record identifier (corresponding to SID above), preferably also the record identifier is protected by means of PTY. Specifically, a floating alteration of the record identifiers in both the operative database and the data element protection catalogue can be made at desired intervals and at randomly selected times, in accordance with the above-described PTY principle. In the preferred embodiment, especially the encapsulated processor which is used for the PTY encryption can also be used for implementation of the callings to the data element protection catalogue and the procedure for processing according to the collected protection attributes.

The invention will now be explained in more detail with reference to the accompanying drawings, which schematically illustrate the inventive principle implemented in an exemplifying data system.

BRIEF DESCRIPTION OF THE DRAWINGS

FIG. 5 shows an example of a display image for determining of protection attributes in the data element protection catalogue.

DESCRIPTION OF THE PREFERRED EMBODIMENT

In the following, the designation IAM (which stands for Information Assets Manager) will be used for the components and applications which in the embodiment are essential to the implementation of the invention.

Figure 1:
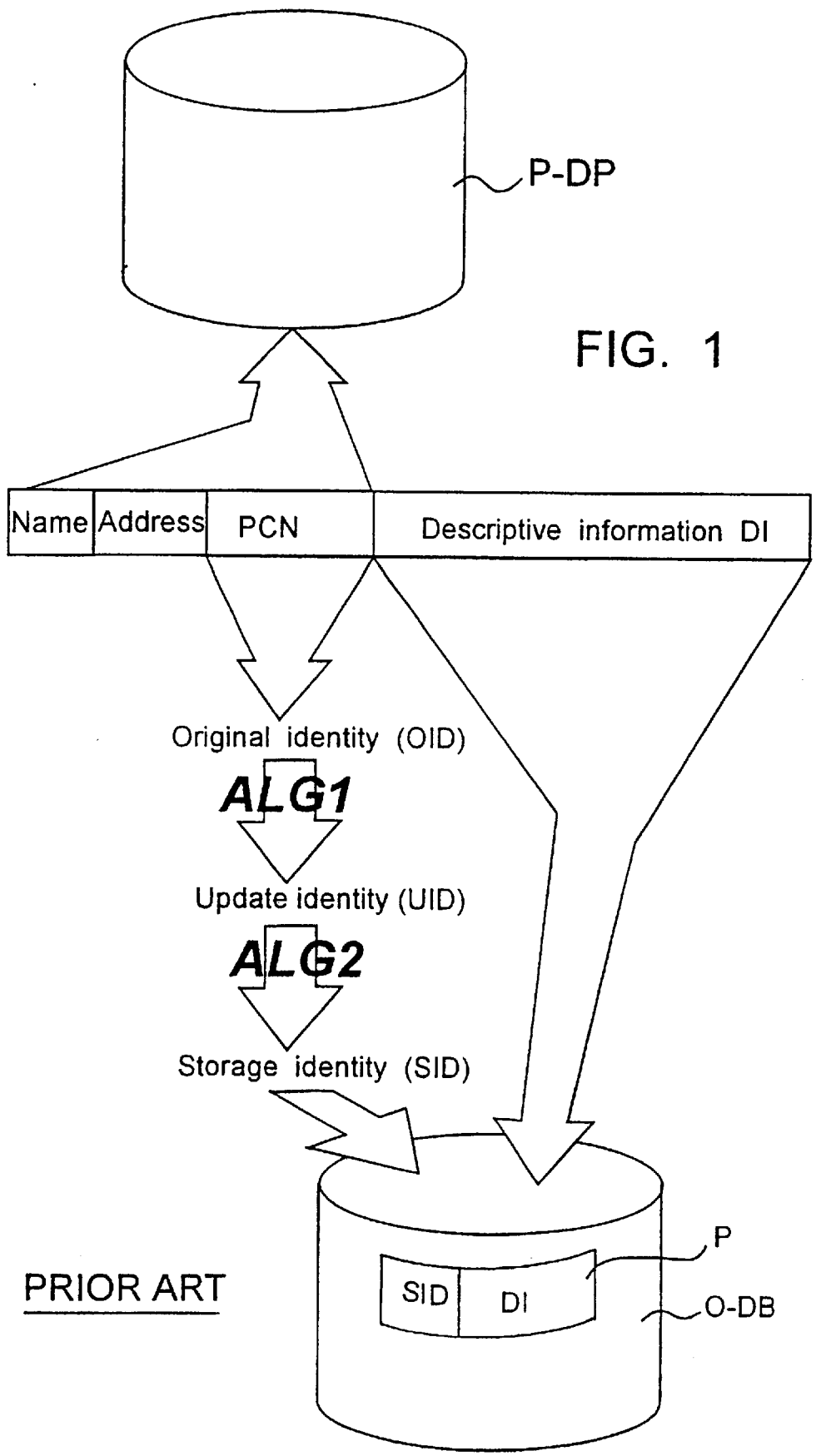
FIG. 1 (prior art) schematically shows the principle of storing of data information according to the PTY principle in WO95/15628.
Figure 2:
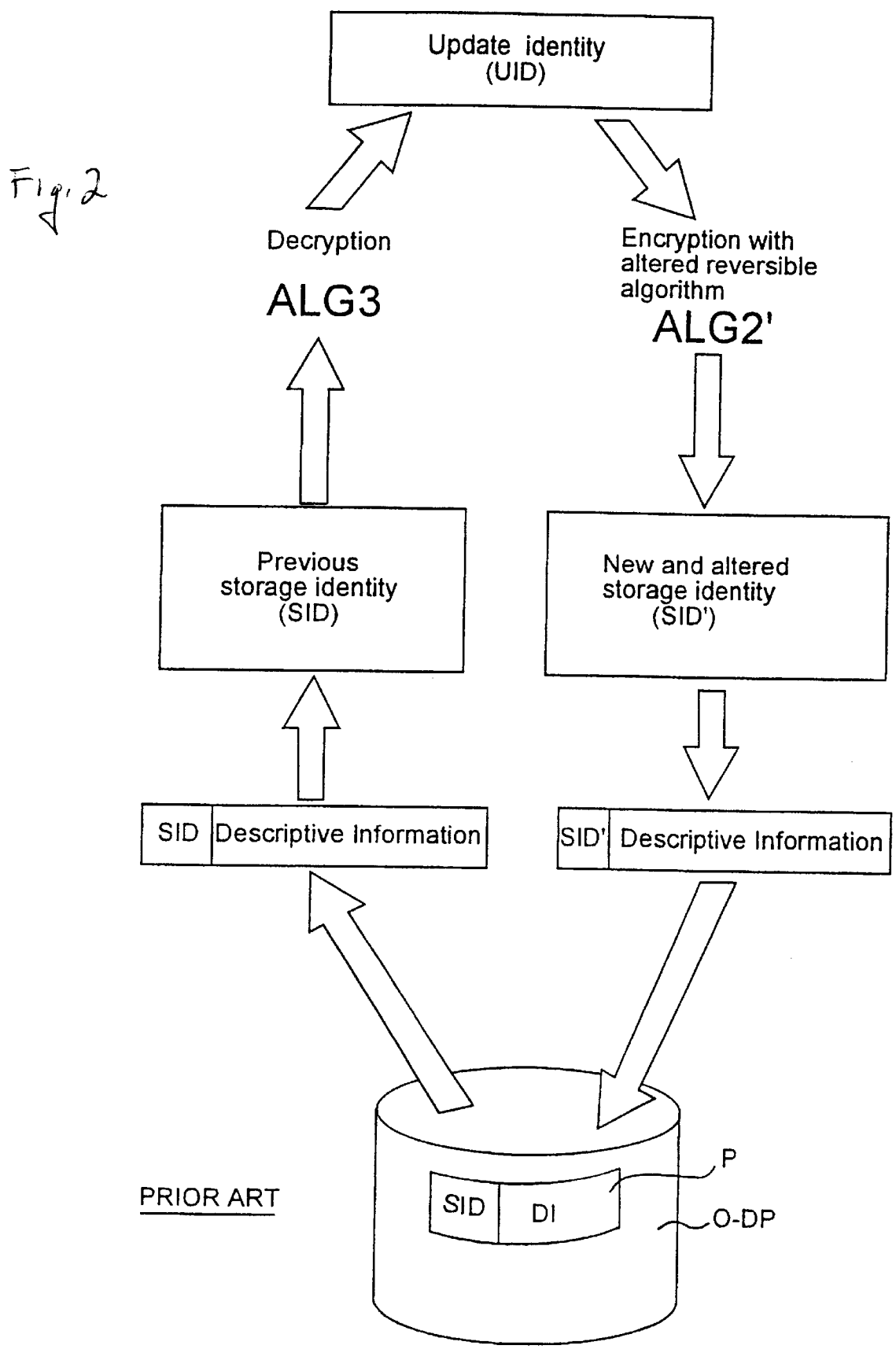
FIG. 2 (prior art) schematically shows the principle of producing floating storing identities according to the PTY principle in WO95/15628.
Figure 3:
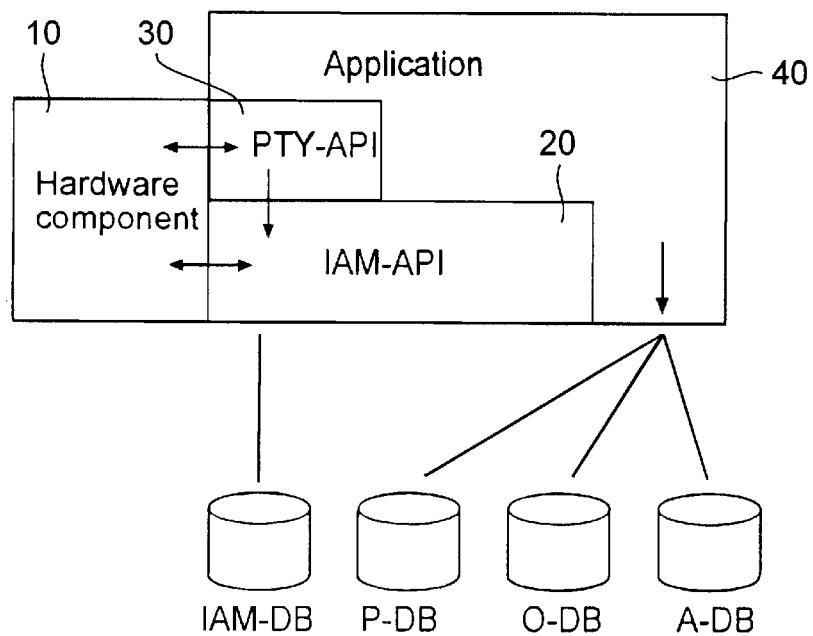
FIG. 3 schematically shows a computer system for implementing the method according to the invention.

Reference is first made to FIG. 3, which schematically illustrates a data managing system, in which the present invention is implemented and in which the following databases are included for storing information, in this example person-related information:

An open database P-DB which contains generally accessible data, such as personal name, article name, address etc. with the personal code number Pcn as plain text as record identifier;

An operative database O-DB, which contains data that is to be protected. Encrypted identification, in this case an encrypted personal code number, is used as record identifier (=storage identity SID). O-DB is used by authorised users for processing of individual records, such as reading and update;

An archive-database A-DB, which contains data transferred (sorted out) from the operative database O-DB and which is used for statistic questions, but not for questions directed to individual records. The transfer from O-DB to A-DB may take place in batches.

A database IAM-DB, which is a database essential to the implementation of the invention. This database contains a data element protection catalogue with protection attributes for such data element types as are associated with data element values in records in the operative database O-DB. This database IAM-DB is preferably physically separated from the other O-DB and is inaccessible to the user. However, two or more sets of the data element protection catalogue may be available: on the one hand an original version to which only an authorised IAM operator has access and, on the other hand, a copy version which imports the data element protection catalogue from the original version and which may optionally be stored on the same file storage as the operative database O-DB. The two versions may be remote from each other, for instance be located in two different cities.

The data system in FIG. 3 further comprises a hardware component 10, a control module 20 (IAM-API), and a program module 30 (PTY-API). The function of these three components will now be described in more detail.

Hardware Component 10

The hardware component 10 acts as a distributed processor of its own in a computer. It has an encapsulation that makes it completely tamper-proof, which means that monitoring by so-called trace tools will not be possible.

The hardware component 10 can as an independent unit perform at least the following functions:

Creating variable, reversible and non-reversible encrypting algorithms for the PTY encryption and providing these algorithms with the necessary variables;

Initiating alterations of storage identities (SID) in stored data according to PTY, on the one hand data in O-DB and, on the other hand, data in the data element protection catalogue of IAM-DB;

Storing user authorizations having access to records in O-DB; and

Linking original identities OID to the correct record in O-DB.

Control Module 20 (IAM-API)

The control module 20 controls the handling of the types of data protection that the system can supply.

The control module carries out the processing requested via API (Application Program Interface) programming interface.

Program Module 30 (PTY-API) 30

The program module (PTY-API) 30 handles the dialogue between the application 40 involved (including ACS) and the hardware component 10. This module may further log events and control sorting out/removal of data from the operative database O-DB.

Figure 4:
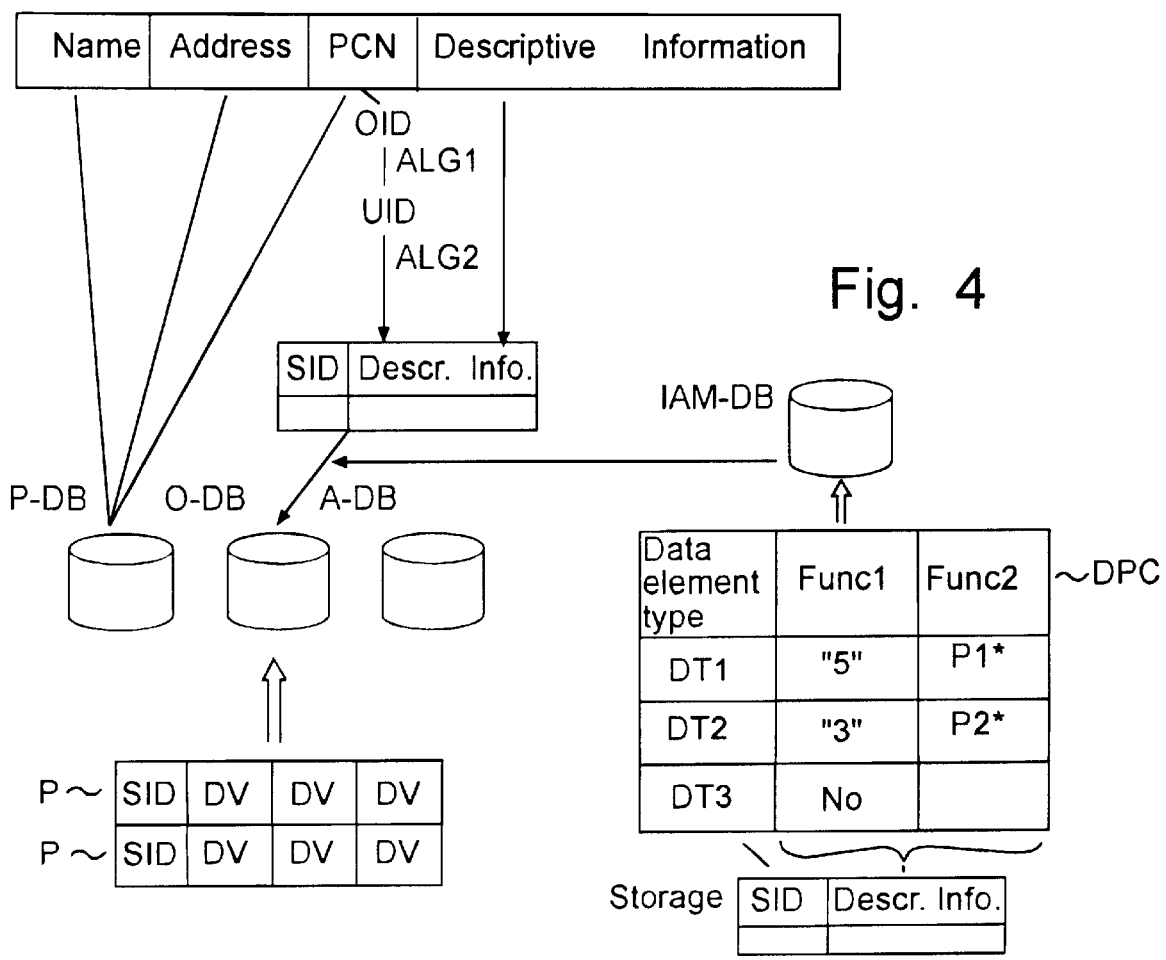
FIG. 4 schematically shows the principle of data processing according to the invention with compelling callings to a data element protection catalogue.

Reference is now made to FIG. 4, which illustrates the same four databases (P-DB, O-DB, A-DB, IAM-DB) as in FIG. 3 and which schematically illustrates how the processing of individual data elements are, according to the invention, controlled according to the rules that are stated by protection attributes in the data element protection catalogue, which is stored in the database IAM-DB.

The data that is to be stored concerns in this example a certain individual and contains: (1) generally accessible data such as name and address, (2) identifying information, such as personal code number (Pcn), and (3) descriptive information (DI). The generally accessible data name and address is stored together with personal code number (Pcn) in the open database P-DB, said storage being performable as plain text since this information is of the type that is generally accessible.

For storing the identifying information in combination with the descriptive information DI, the following steps will, however, be made, in which the following designations are used to describe encrypting and decrypting algorithms. Generally speaking, the encrypting and decrypting algorithms can be described as follows:

$$F_{Type}(\text{Random number, Input data}) = \text{Results}$$

wherein:
F designates a function.
Type indicates the type of function as follows:
   $F_{KIR}$=Non-reversible encrypting algorithm
   $F_{KR}$=Reversible encrypting algorithm
   $F_{DKR}$=Decrypting algorithm
Random number
   represents one or more constants and/or variables included in the function F.
Input data
   are the data to be encrypted or decrypted, and
Results indicate a unique function value for a given function Step 1
Division of the Information
   Identifying information is separated from descriptive information;

Step 2
Preparation of Storage Identity SID:
   An original identity OID is selected based on the identifying information. OID is here selected to be equal to the personal code number Pcn of the individual. OID is encrypted by means of a non-reversible encrypting algorithm ALG1, prepared randomly by the hardware component 10, to an update identity UID as follows:

ALG1: $F_{KIR}$(Random number, OID)=UID

ALG1 is such that attempts at decryption of UID to OID result in a great number of identities, which makes it impossible to link a specific UID to the corresponding OID.
   Then UID is encrypted by means of a reversible algorithm ALG2, which is also produced at random by the hardware component 10, for generating a storage identity SID as follows:

ALG2: $F_{KR}$(Random number, UID)=SID

ALG2 is such that there exists a corresponding decrypting algorithm ALG3, by means of which SID can be decrypted in order to recreate UID.
   The storage identity SID is used, as described in step 4 above, as encrypted record identifier when storing encrypted data element values DV in the operative database O-DB.

Step 3
Production of Encrypted Data Element Values DV:
   The descriptive information DI associated with the original identity OID is converted into one or more encrypted data element values DV linked to a data element type DT each.
   The encryption takes place as described below with a reversible encryption function $F_{KR}$, which like the algorithms ALG1 and ALG2 above is also produced at random by the hardware component 10. The invention is distinguished by a compelling calling here being sent to the data element protection catalogue in the database IAM-DB for automatic collection of the protection attribute which is linked to the data element type at issue and which indicates "strength" or degree with which the encryption of the descriptive data is to be performed so as to generate the data element value DV.
   The table, which in FIG. 4 is shown below the database IAM-DB, symbolizes an exemplifying content of the data element protection catalogue, here designated DPC. As an example, it may here be assumed that the protection function Func1 corresponds to "degree of encryption". If the descriptive information DI at issue is to be stored as a data element value DV associated with the specific data element type DT1 in the data element protection catalogue, the protection attribute "5" registered in the data element protection catalogue is collected automatically in this case. The descriptive information DI at issue will thus, automatically and compellingly, be encrypted with the strength "5" for generating an encrypted data element value DV as follows:

$F_{KR}$(Random number, DI)=encrypted data element value DV

For storing a less sensitive data element, for instance a data element of the data element type DT3, the compelling calling to the data element protection catalogue in IAM-DB would instead have resulted in the protection attribute "no" being collected, in which case no encryption would have been made on the descriptive data at issue, which then could be stored as plain text in the operative database ODB.

Step 4
Storing of Records in the Operative Database O-DB:
   The encrypted storage identity SID according to step 2 in combination with the corresponding encrypted data element value or data element values DV according step 3 are stored as a record in the operative database O-DB.
   As appears from the foregoing, a stored information record P has the following general appearance:

| Storage identity (SID) | Descript. information in the form of encrypted data element values | | | |
|---|---|---|---|---|
| | DV1 | DV2 | DV3 | DV4 |

The original identity OID is encrypted according to the PTY principle in two steps, of which the first is non-reversible and the second is reversible. Thus, it is impossible to store the descriptive information DI along with a storage identity SID that never can be linked to the original identity OID, as well as to create "floating", i.e. which change over time, storage identities SID while retaining the possibility of locating, for a specific original identity OID, the associated descriptive information DI stored.
   The descriptive data DI is stored in accordance with protection attributes linked to each individual data element. This results in a still higher level of protection and a high degree of flexibility as to the setting up of rules, and continuous adaptation thereof, of how sensitive data is allowed to be used and can be used, down to the data element level.
   To increase the level of protection still more, the data element protection catalogue DPC is preferably stored in IAM-DB in encrypted form in accordance with the PTY principle, in which case for instance the data element types correspond to the above storage identity and the protection attributes correspond to the descriptive information or data element values above, as schematically illustrated in FIG. 4. This efficiently prevents every attempt at circumventing the data element protection by unauthorized access and interpretation of the content of the data element protection catalogue.
   In the illustrated embodiment, PTY can thus have the following functions:
Protecting the original identity OID in encrypted form (SID) on the operative database O-DB (as is known from said WO95/15628), Protecting information in IAM-DB, particularly the protection attributes of the data element protection catalogue and the associated record identifier, and Protecting descriptive information DI in the form of encrypted data element values DV for the data element types that have the corresponding protection activated in the data element protection catalogue, and in accordance with the corresponding protection attributes.

Functionality Protection

In the above embodiment of the procedure for inputting data in the operative database O-DB, only "degree of encryption" has so far been discussed as data element protection attribute in the data element protection catalogue DC. However, this is only one example among a number of possible protection attributes in the data element protection catalogue, which normally offers a plurality of protection attitudes for each data element. Preferred protection attributes have been indicated above in the general description.

A particularly interesting protection attribute is "protected programs". The use of this data element protection attribute means that the data system may offer a new type of protection, which is here called "functionality protection" and which means that only accepted or certified programs are allowed to be used and can be used in the system in the processing of data. It should be noted that this type of protection is still, according to the invention, on the data element level.

Now assume for the purpose of illustration that Func2 in the data element protection catalogue DPC in FIG. 4 corresponds to this protection attribute and that data elements of the data element type DT1 and DT2, respectively, are only allowed to be processed with the accepted applications or programs P1 and P2, respectively. Unauthorized handling of the corresponding data elements by means of, for instance, a different program P3, or a modified version P1' of P1, should be prevented. As protection attribute in the data element protection catalogue, data identifying P1 and P2 is therefore stored. In a preferred example, an encryptographic check sum P1* and P2*, respectively, is created, in a manner known per se, based on every accepted program P1 and P2, respectively. These check sums may be considered to constitute a unique fingerprint of the respective accepted programs, and these fingerprints can be stored as protection attributes in the data element protection catalogue as illustrated schematically in FIG. 4. It should however be noted that such check sums for accepted programs can optionally be stored in a data element protection catalogue of their own for registering of accepted programs, separately from the data element protection catalogue with protection attributes for encryption strength.

If the last-mentioned type of protection "protected programs" is used, it should also be noted that the system, in connection with a user-initiated measure aiming at processing of a given data element, for instance inputting a new data element value in a certain record, need not carry out a complete examination of all programs accepted in the system. If, for instance, the user tries to use a program P3 for inputting in the operative database O-DB a new data element value, a compelling calling is sent to the data element protection catalogue in connection with the corresponding data element type, for instance DTI. The associated protection attribute P1* is then collected from the data element protection catalogue, which means that such a data element value is only allowed to be stored by means of the program P1. The attempt at registering the data element value by means of the program P3 would therefore fail.

By periodic use of the above-described functionality protection, it is possible to reveal and/or prevent that an unauthorized person (for instance a "hacker") breaks into the system by means of a non-accepted program and modifies and/or adds descriptive data in such a manner that the descriptive data will then be identifying for the record. The data element values are thus not allowed to become identifying in the operative database O-DB.

Traceability/logging

"Logging" or "traceability" is another type of protection which according to the invention can be linked to a data element type in the data element protection catalogue. If this protection is activated for a certain data element type, each processing of the corresponding data element values in the operative database O-DB will automatically and compellingly result in relevant information on the processing ("user", "date", "record", "user program" etc.) being logged in a suitable manner, so that based on the log, it is possible to investigate afterwards who has processed the data element values at issue, when, by means of which program etc.

Reading of Data from the Operative Database O-DB

In connection with a user-initiated measure aiming at reading/altering data element values in the stored records in the operative database O-DB, the following steps are carried out, which specifically also comprise a compelling calling to the data element protection catalogue and "unpacking" of the data which is controlled automatically and compellingly by collected protection attributes.

Step 1

The record is identified by producing the storage identity SID at issue based on the original identity OID, (Pcn) that is associated with the data element value DV which is to be read, as follows $$F_{KR}(F_{KIR}(OID))=SID$$

Step 2

When the record has been found by means of SID, the encrypted data element value DV (i.e. the encrypted descriptive data that is to be read) is decrypted as follows by means of a decrypting algorithm $F_{DKR}$:

$$F_{DKR}(DV)=\text{descriptive data (plain text)}$$

The carrying out of this decryption of the data element value, however, requires that the encryption-controlling protection attribute of the data element is first collected by the system from the data element protection catalogue DC, i.e. the attribute indicating with which strength or at which level the data element value DV stored in O-DB has been encrypted. Like in the above procedure for inputting of data in O-DB, also when reading, a compelling calling thus is sent to the data element protection catalogue DC for collecting information which is necessary for carrying out the processing, in this case the unpacking.

It will be appreciated that such a compelling calling to the data element protection catalogue DC, when making an attempt at reading, may result in the attempt failing, wholly or partly, for several reasons, depending on the protection attribute at issue, which is linked to the data element value/values that is/are to be read. For instance, the attempt at reading may be interrupted owing to the user trying to use a non-accepted program and/or not being authorized to read the term involved.

If the data element protection catalogue is encrypted, the decoding key can be stored in a storage position separate from the first and the second database.

FIG. 5 shows an example of a user interface in the form of a dialogue box, by means of which a person responsible for IAM, i.e. a person responsible for security, may read and/or alter the protection attributes stated in the data element protection catalogue. In the Example in FIG. 5, the data element types "Housing allowance" and "Social allowance" have both been provided with protection attributes concerning encryption, sorting out, logging and owner. Moreover, registration of authorized users and protected programs linked to the data element type "Social allowance" has taken place in submenus.

What is claimed is:

1. A method for processing of data that is to be protected, comprising:

storing the data as encrypted data element values (DV) in records (P) in a first database (O-DB), the first database (O-DB) having a table structure with rows and columns, each row representing a record (P) and each combination of a row and a column representing a data element value (DV), in the first database (O-DB) each data element value (DV) is linked to a corresponding data element type (DT);

storing in a second database (IAM-DB) a data element protection catalogue (DPC), which contains each individual data element type (DT) and one or more protection attributes stating processing rules for data element values (DV), which in the first database (O-DB) are linked to the individual data element type (DT);

for each user-initiated measure aiming at processing of a given data element value (DV) in the first database (O-DB), initially producing a calling to the data element protection catalogue for collecting the protection attribute/attributes associated with the corresponding data element type, and controlling the user's processing of the given data element value in conformity with the collected protection attribute/attributes.

2. A method as claimed in claim 1, further comprising the measure of storing the protection attribute/attributes of the data element protection catalogue (DC) in encrypted form in the second database (IAM-DB) and, when collecting protection attribute/attributes from the data element protection catalogue (DC) effecting decryption thereof.

3. A method as claimed in claim 1, wherein each record (P) in the first database (O-DB) has a record identifier, and wherein the method further comprises the measure of storing the record identifier in encrypted form (SID) in the first database (O-DB).

4. A method as claimed in claim 1, wherein the encryption of data in the first database (O-DB) and/or the encryption of data in the second database (IAM-DB) is carried out in accordance with a PROTEGRITY principle with floating storage identity.

5. A method as claimed in claim 1, wherein the protection attribute/attributes of the data element types comprise attributes stating rules for encryption of the corresponding data element values in the first database (O-DB).

6. A method as claimed in claim 1, wherein the protection attribute/attributes of the data element types comprise attributes stating rules for which program/programs or program versions is/are allowed to be used for managing the corresponding data element values in the first database (O-DB).

7. A method as claimed in claim 1, wherein the protection attribute/attributes of the data element values comprise attributes stating rules for logging the corresponding data element values in the first database (O-DB).

8. An apparatus for processing data that is to be protected, comprising:

a first database (O-DB) for storing said data as encrypted data element values (DV) in records (P), said first database (O-DB) having a table structure with rows and columns, each row representing a record (P) and each combination of a row and a column representing a data element value (DV), in said first database (O-DB) each data element value (DV) is linked to a corresponding data element type (DT);

a second database (IAM-DB) for storing a data element protection catalogue (DPC), which contains each individual data element type (DT) and one or more protection attributes stating processing rules for data element values (DV), which in the first database (O-DB) are linked to the individual data element type (DT);

means which are adapted, in each user-initiated measure aiming at processing a given data element value (DV) in the first database (O-DB), to initially produce a calling to the data element protection catalogue for collecting the protection attribute/attributes associated with the corresponding data element types, and means which are adapted to control the user's processing of the given data element value in conformity with the collected protection attribute/attributes.

9. A method for processing of confidential data comprising the steps of:

providing a first database (P-DB), a second database (O-DB), and a third database (IAM-DB), the second database (O-DB) having a table structure with rows and columns, each row representing a record (P) and each combination of a row and a column representing a data element value (DV), in the second database (O-DB) each data element value (DV) is linked to a corresponding data element type (DT) of a plurality of different data element types;

entering descriptive information (DI) corresponding to a data element value (DV), with certain portions of the descriptive information being classified as certain data element types (DT) of the plurality of different data element types;

assigning an initial identity (OID) to the descriptive information;

storing a first record in the first database including in the initial identity;

encrypting the initial identity to form a storage identity (SID);

accessing a catalogue (DCP) of encryption protection degrees in the third database, the catalogue including encryption levels for each of the different data types;

encrypting the certain portions of the descriptive information in accordance with their data types; and storing a second record in the second database including the storage identity and the encrypted descriptive information (DV).

10. The method according to claim 9, wherein the third database is physically separate from the second database.

11. The method according to claim 9, wherein said step of encrypting the initial identity to form the storage identity includes a non-reversible encryption followed by a reversible encryption.

12. The method according to claim 9, wherein the catalogue of encryption protection degrees in the third database is encrypted.

13. The method according to claim 9, wherein the catalogue of encryption protection degrees includes encryption rules for encrypting the different data types.

14. The method according to claim 9, wherein the catalogue of encryption protection degrees includes rules for which program or programs may manage the different data types.

15. The method according to claim 9, wherein the first record is not encrypted.

16. The method according to claim 15, wherein the first record includes an individual's name and address.

17. The method according to claim 16, wherein the different data types represent different types of personal data corresponding to the individual.

* * * * *

UNITED STATES PATENT AND TRADEMARK OFFICE
CERTIFICATE OF CORRECTION

PATENT NO.         : 6,321,201 C1                                Page 1 of 2
APPLICATION NO.    : 90/011364
DATED              : October 4, 2011
INVENTOR(S)        : Ulf Dahl It is certified that error appears in the above-identified patent and that said Letters Patent is hereby corrected as shown below:

Column 1, line 55, cancel the text beginning with "19. The method as set forth in claim 1" to and ending "logue (DPC)." in column 1, line 58, and insert the following claim:

--19. The method as set forth in Claim 1, wherein the data element protection catalogue (DPC) containing each individual data element type (DT), comprises storing each individual data element type (DT) as data element type data in the data element protection catalogue (DPC).--

Column 2, line 18, cancel the text beginning with "25. The method as set forth in claim 24" to and ending "type (DT) in the data protection catalogue (DPC)." in column 2, line 25 and insert the following claim:

--25. The method as set forth in Claim 24, further comprises adding a new data element type data (DT) in a new field in a new row in the data protection catalogue (DPC) and adding new data element value data of one or more protection attributes stating processing rules for that data element value (DV) associated with the new data element type (DT) as data element type data in other new fields of the new row and linking at least one of the data element value in the first database to the new data element type (DT) in the data protection catalogue (DPC).--

Column 2, line 62, cancel the text beginning with "35. The method as set forth in claim 33" to and ending "catalogue and first database in different cities." in column 2, line 64 and insert the following claim:

--35. The method as set forth in Claim 33, further comprising storing the imported copy of the database protection catalogue and the first database in different cities.--

Column 3, line 32, cancel the text beginning with "43. The apparatus as set forth in claim 42" to and ending "data protection catalogue (DPC)." in column 3, line 41 and insert the following claim:

Signed and Sealed this
Tenth Day of January, 2012

David J. Kappos
*Director of the United States Patent and Trademark Office*

--43. The apparatus as set forth in Claim 42, further comprises adding a new data element type data (DT) in a new field in a new row in the data protection catalogue (DPC) and adding new data element value data of one or more protection attributes stating processing rules for that data element value (DV) associated with the new data element type (DT) as data element type data in other new fields of the new row and linking at least one of the data element value in the first database to the new data element type (DT) in the data protection catalogue (DPC).--

(12) EX PARTE REEXAMINATION CERTIFICATE (8590th)
United States Patent
Dahl

(10) Number: US 6,321,201 C1
(45) Certificate Issued: Oct. 4, 2011

(54) DATA SECURITY SYSTEM FOR A DATABASE HAVING MULTIPLE ENCRYPTION LEVELS APPLICABLE ON A DATA ELEMENT VALUE LEVEL

(75) Inventor: Ulf Dahl, Old Greenwich, CT (US)

(73) Assignee: Protegrity Corporation, Grand Cayman (KY)

Reexamination Request:
No. 90/011,364, Dec. 1, 2010

Reexamination Certificate for:
Patent No.: 6,321,201
Issued: Nov. 20, 2001
Appl. No.: 09/027,585
Filed: Feb. 23, 1998

Related U.S. Application Data

(63) Continuation of application No. PCT/SE97/01089, filed on Jun. 18, 1997.

(51) Int. Cl.
*G06F 21/00* (2006.01)
*G06F 1/00* (2006.01)

(52) U.S. Cl. .................................. 705/51; 707/999.009
(58) Field of Classification Search ........................ 705/1
See application file for complete search history.

(56) References Cited

U.S. PATENT DOCUMENTS

| | | |
|---|---|---|
| 4,774,661 A | 9/1988 | Kumpati |
| 4,827,508 A | 5/1989 | Shear |
| 4,890,319 A | 12/1989 | Seth-Smith et al. |
| 4,918,728 A | 4/1990 | Matyas et al. |
| 4,924,514 A | 5/1990 | Matyas et al. |
| 4,941,176 A | 7/1990 | Matyas et al. |
| 4,956,769 A | 9/1990 | Smith |
| 5,022,076 A | 6/1991 | Rosenow et al. |
| 5,027,401 A | 6/1991 | Soltesz |
| 5,070,528 A | 12/1991 | Hawe et al. |

(Continued)

FOREIGN PATENT DOCUMENTS

| | | |
|---|---|---|
| EP | 0614150 A2 | 9/1994 |
| EP | 0891661 A1 | 1/1999 |
| EP | 1091305 A1 | 4/2001 |
| GB | 2248951 A | 4/1992 |
| GB | 2242295 A | 9/2007 |
| GB | 2435945 A | 9/2007 |

(Continued)

OTHER PUBLICATIONS

Microsoft Excel Version 4.0 for Windows, User's Guide, Microsoft Corporation 1992, Document Nos. AB26296-0392, AB26297-302, AB26298-0392, AB29299-0392. See especially AB26296, pp. i–vi, 84–90, 235, 237, 292–294.

(Continued)

*Primary Examiner* — Minh Dieu Nguyen

(57) ABSTRACT

A method and an apparatus for processing data provides protection for the data. The data is stored as encrypted data element values (DV) in records (P) in a first database (O-DB), each data element value being linked to a corresponding data element type (DT). In a second database (IAM-DB), a data element protection catalogue (DC) is stored, which for each individual data element type (DT) contains one or more protection attributes stating processing rules for data element values (DV), which in the first database (O-DB) are linked to the individual data element type (DT). In each user-initiated measure which aims at processing a given data element value (DV) in the first database (O-DB), a calling is initially sent to the data element protection catalogue for collecting the protection attribute/attributes associated with the corresponding data element types. The user's processing of the given data element value is controlled in conformity with the collected protection attribute/attributes.

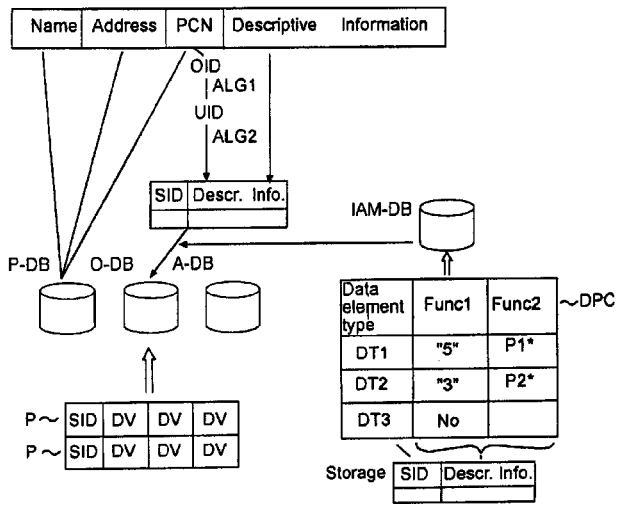

U.S. PATENT DOCUMENTS

| | | |
|---|---|---|
| 5,123,047 A | 6/1992 | Rosenow |
| 5,128,996 A | 7/1992 | Rosenow et al. |
| 5,175,766 A | 12/1992 | Hamilton |
| 5,210,868 A | 5/1993 | Shimada et al. |
| 5,265,164 A | 11/1993 | Matyas et al. |
| 5,319,699 A | 6/1994 | Kerihuel et al. |
| 5,343,527 A | 8/1994 | Moore |
| 5,355,474 A | 10/1994 | Thuraisngham et al. |
| 5,365,588 A | 11/1994 | Bianco et al. |
| 5,365,589 A | 11/1994 | Gutowitz |
| 5,396,623 A | 3/1995 | McCall et al. |
| 5,412,717 A | 5/1995 | Fischer |
| 5,418,942 A | 5/1995 | Krawchuk et al. |
| 5,436,970 A | 7/1995 | Ray et al. |
| 5,444,616 A | 8/1995 | Nair et al. |
| 5,448,047 A | 9/1995 | Nair et al. |
| 5,475,826 A | 12/1995 | Fischer |
| 5,481,601 A | 1/1996 | Nazif et al. |
| 5,539,906 A | 7/1996 | Abraham et al. |
| 5,550,976 A | 8/1996 | Henderson et al. |
| 5,555,409 A | 9/1996 | Leenstra, Sr. et al. |
| 5,560,005 A | 9/1996 | Hoover et al. |
| 5,564,119 A | 10/1996 | Krawchuk et al. |
| 5,600,833 A | 2/1997 | Senn et al. |
| 5,646,997 A | 7/1997 | Barton |
| 5,673,316 A | 9/1997 | Auerbach et al. |
| 5,678,041 A | 10/1997 | Baker et al. |
| 5,694,590 A | 12/1997 | Thuraisingham et al. |
| 5,699,428 A | 12/1997 | McDonnal et al. |
| 5,706,507 A | 1/1998 | Schloss |
| 5,708,812 A | 1/1998 | Van Dyke et al. |
| 5,710,889 A | 1/1998 | Clark et al. |
| 5,721,895 A | 2/1998 | Velissaropoulos et al. |
| 5,748,738 A | 5/1998 | Bisbee et al. |
| 5,751,949 A | 5/1998 | Thomson et al. |
| 5,752,034 A | 5/1998 | Srivastava et al. |
| 5,758,340 A | 5/1998 | Nail |
| 5,758,347 A | 5/1998 | Lo et al. |
| 5,761,496 A | 6/1998 | Hattori |
| 5,764,772 A | 6/1998 | Kaufman et al. |
| 5,764,978 A | 6/1998 | Masumoto |
| 5,768,382 A | 6/1998 | Schneier et al. |
| 5,778,365 A | 7/1998 | Nishiyama |
| 5,781,628 A | 7/1998 | Alperovich et al. |
| 5,781,905 A | 7/1998 | Awane et al. |
| 5,787,175 A | 7/1998 | Carter |
| 5,787,416 A | 7/1998 | Tabb et al. |
| 5,805,719 A | 9/1998 | Pare, Jr. et al. |
| 5,819,251 A | 10/1998 | Kremer et al. |
| 5,842,212 A | 11/1998 | Ballurio et al. |
| 5,845,281 A | 12/1998 | Benson et al. |
| 5,862,325 A | 1/1999 | Reed et al. |
| 5,864,856 A | 1/1999 | Young |
| 5,867,494 A | 2/1999 | Krishnaswamy et al. |
| 5,870,723 A | 2/1999 | Pare, Jr. et al. |
| 5,870,764 A | 2/1999 | Lo et al. |
| 5,873,097 A | 2/1999 | Harris et al. |
| 5,878,415 A | 3/1999 | Olds |
| 5,884,312 A | 3/1999 | Dustan et al. |
| 5,890,140 A | 3/1999 | Clark et al. |
| 5,897,622 A | 4/1999 | Blinn et al. |
| 5,905,984 A | 5/1999 | Thorsen |
| 5,915,025 A | 6/1999 | Taguchi et al. |
| 5,917,912 A | 6/1999 | Ginter et al. |
| 5,918,013 A | 6/1999 | Mighdoll et al. |
| 5,924,094 A | 7/1999 | Sutter |
| 5,930,795 A | 7/1999 | Chen et al. |
| 5,933,826 A | 8/1999 | Ferguson |
| 5,949,876 A | 9/1999 | Ginter et al. |
| 5,960,437 A | 9/1999 | Krawchuk et al. |
| 5,963,642 A | 10/1999 | Goldstein |
| 5,970,143 A | 10/1999 | Schneier et al. |
| 5,970,494 A | 10/1999 | Velissaropoulos et al. |
| 5,978,811 A | 11/1999 | Smiley |
| 5,978,840 A | 11/1999 | Nguyen et al. |
| 5,982,891 A | 11/1999 | Ginter et al. |
| 5,983,350 A | 11/1999 | Minear et al. |
| 5,991,791 A | 11/1999 | Siefert |
| 5,999,525 A | 12/1999 | Krishnaswamy et al. |
| 5,999,943 A | 12/1999 | Nori et al. |
| 6,004,276 A | 12/1999 | Wright et al. |
| 6,006,228 A | 12/1999 | McCollum et al. |
| 6,016,491 A | 1/2000 | Kou |
| 6,018,744 A | 1/2000 | Mamiya et al. |
| 6,044,205 A | 3/2000 | Reed et al. |
| 6,044,462 A | 3/2000 | Zubeldia et al. |
| 6,047,374 A | 4/2000 | Barton |
| 6,058,373 A | 5/2000 | Blinn et al. |
| 6,065,014 A | 5/2000 | Wakio et al. |
| 6,065,046 A | 5/2000 | Feinberg et al. |
| 6,069,952 A | 5/2000 | Saito et al. |
| 6,078,925 A | 6/2000 | Anderson et al. |
| 6,081,518 A | 6/2000 | Bowman-Amuah |
| 6,082,776 A | 7/2000 | Feinberg |
| 6,085,976 A | 7/2000 | Sehr |
| 6,088,717 A | 7/2000 | Reed et al. |
| 6,091,819 A | 7/2000 | Venkatesan et al. |
| 6,092,189 A | 7/2000 | Fisher et al. |
| 6,098,076 A | 8/2000 | Rekieta et al. |
| 6,101,604 A | 8/2000 | Barton |
| 6,108,635 A | 8/2000 | Herren et al. |
| 6,112,199 A | 8/2000 | Nelson |
| 6,115,818 A | 9/2000 | Barton |
| 6,119,105 A | 9/2000 | Williams |
| 6,122,631 A | 9/2000 | Berbec et al. |
| 6,122,640 A | 9/2000 | Pereira |
| 6,128,618 A | 10/2000 | Eliovson |
| 6,157,721 A | 12/2000 | Shear et al. |
| 6,173,289 B1 | 1/2001 | Sonderegger et al. |
| 6,233,576 B1 | 5/2001 | Lewis |
| 6,233,592 B1 | 5/2001 | Schnelle et al. |
| 6,275,824 B1 | 8/2001 | O'Flaherty |
| 6,377,959 B1 | 4/2002 | Carlson |
| 6,397,307 B2 | 5/2002 | Ohran |
| 6,549,921 B1 | 4/2003 | Ofek |
| 6,581,090 B1 | 6/2003 | Lindbo et al. |
| 6,687,683 B1 | 2/2004 | Harada et al. |
| 6,862,582 B2 | 3/2005 | Harada et al. |
| 7,055,040 B2 | 5/2006 | Klembra et al. |
| 7,120,802 B2 | 10/2006 | Shear et al. |
| 2006/0020622 A1 | 1/2006 | Shelton |

FOREIGN PATENT DOCUMENTS

| | | |
|---|---|---|
| JP | 11-234270 A | 8/1999 |
| JP | 2000-115158 A | 4/2000 |
| JP | 03-276936 A | 10/2003 |
| JP | 07-219900 A | 8/2007 |
| RU | 2022343 C1 | 8/1990 |
| RU | 2067313 C1 | 3/1995 |
| RU | 2198423 C2 | 6/1997 |
| WO | 93/11619 A1 | 6/1993 |
| WO | WO 95/15628 A1 | 6/1995 |
| WO | 95/15628 | 6/1995 |
| WO | 97/49054 A3 | 12/1997 |
| WO | 97/49211 A1 | 12/1997 |
| WO | 98/17039 A1 | 4/1998 |
| WO | 98/50911 A2 | 11/1998 |
| WO | 99/08206 A1 | 2/1999 |
| WO | 01/35226 A1 | 5/2001 |
| WO | 02/01271 A1 | 1/2002 |

OTHER PUBLICATIONS

IBM DB2 Version 2 Release 3 reference manuals SC26–4374–02 through SC26–4380–02, 1992.

C.J. Date et al., A Guide to DB2, Third Edition, 1984, pp. 21–27, 141–145.

C.J. Date et al., An Introduction to Database Systems, Sixth Edition, reprinted Nov. 1994, pp. 60–61, 416–427, 433–434, 440–442.

FIPS Pub 140–1 Security Requirements for Cryptographic Modules, US Dept. of Commerce/National Institute of Standards and Technology Jan. 11, 1994.

Denning, Dorothy, Field encryption and authentication, in Advances in Cryptography, Proc. of Crypto 83: 231–247, 1983.

Hardjono, Thomas and Seberry, Jennifer, A Multilevel Encryption Scheme for Database Security, in proceedings of the 12th Australian Computer Science Conference (Wollogong) p. 209–218, Feb. 1989.

Ashton–Tate Advanced Topics (1998).

Denning, Dorothy "Cryptographic Checksums for Multi-level Database Security" in Proceedings of the 1984 Symposium on Secrecy and Privacy 52 (1984).

Fernandez, E.B., R.C. Summers and C.D. Coleman, "An Authorization Model for a Shared Database" in Proceedings of the 9785 ACM SIGMOD International Conference on Management of Data (1975).

Gudes, Ehud, Harvey S. Koch and Fred A. Stahl, "The Application of Cryptograhpy for Data Base Security" in Proceedings of the Jun. 7–10, 1976 National Computer Conference an Exposition (1976).

Omar, Khamios A. and David L. Wells, "Modified Architecture for the Sub–Keys Model," IEEE Symposium on Security and Privacy 79 (1983).

U.S. Dept. of Defense, Trusted Computer System Evaluation Criteria (1985) ("DoD Criteria").

ASC X12 Standard, Version 003050, 1984.

Pretty Good Privacy or Other E–mail Encryption Program by Phil Zimmerman, in common public use since 1991.

Wood, Charles Cresson, "Principles of Secure Information Systems Design with Groupware Examples," in Group-Ware'92.

DeJean, David and Sally Blanning DeJean, Lotus Notes at Work (1991).

Nelson, Fritz, "Notes 2.0 Flexibly Shares Information," Infoworld 59 (Aug. 12, 1991).

Glass, Brett, "Lotus Notes: a New Product with Deep Roots," Infoworld (Jan. 22, 1990).

Kerwien, Erica, Lotus Notes Application Development Handbook (1994).

Ashton–Table, Language Reference (1988).

Commission on Multilevel Data Management Security, Multilevel Data Management Security Manual 1983.

Davida et al., A Database Encryption System With Subkeys, 1981.

"dBASE Security," in *Ashton–Tate Advanced Topics,* Ashton–Tate Corporation, 20 pages, (1988).

Date, C. J., "An Introduction to Database Systems," Sixth Edition, Addison–Wesley Publishing Company, Reading, Massachusetts, United States, pp. 60–61, 416–427, 433–434, 440–442, (1995).

DeJean, David and DeJean, Sally Blanning, "Lotus Notes at Work," Brady, United States, pp. 25–39, 167–186, (1991).

Denning, Dorothy E., "Cryptographic checksums for Multi-level Database Security," presented at the *IEEE Symposium on Security and Privacy,* Oakland, California, 10 pages, Apr. 30–May 2, 1984.

Denning, Dorothy E., "Field Encryption and Authentication," Advances in Cryptology, Proceedings of Crypto 83, Plenum Press, New York, United States, 17 pages, (1983).

Fernádez, E.B., et al., "An Authorization Model for a Shared Database," IBM Los Angeles Scientific Center, United States, (1975).

Omar, Khamis A. and Wells, David L., "Modified Architecture for the Sub–Keys Model," *IEEE Symposium on Security and Privacy,* pp. 79–86, (1983).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

Claims 9-17 are cancelled.

Claim 8 is determined to be patentable as amended.

New claims 18-53 are added and determined to be patentable.

8. An apparatus for processing data that is to be protected, comprising:
- a first database (O-DB) for storing said data as encrypted data element values (DV) in records (P), said first database (O-DB) having a table structure with rows and columns, each row representing a record (P) and each combination of a row and a column representing a data element value (DV), in said first database (O-DB) each data element value (DV) is linked to a corresponding data element type (DT);
- a second database (IAM-DB) for storing a data element protection catalogue (DPC), which contains each individual data element type (DT) and one or more protection attributes stating processing rules for data element values (DV), which in the first database (O-DB) are linked to the individual data element type (DT);
- [means which are] *said apparatus being* adapted, in each user-initiated measure aiming at processing a given data element value (DV) in the first database (O-DB), to initially produce a calling to the data element protection catalogue for collecting the protection attribute/attributes associated with the corresponding data element types, and
- [means which are] *said apparatus being* adapted to control the user's processing of the given data element value in conformity with the collected protection attribute/attributes.

*18. The method as set forth in claim 1, wherein the records include the encrypted data element values (DV) and at least one unencrypted data element value.*

*19. The method as set forth in claim 1, wherein the data element protection catalogue (DPC) containing each individual data element type (DT), comprises storing each catalogue (DPC).*

*20. The method as set forth in claim 19, wherein the data element protection catalogue (DPC) containing the one or more protection attributes stating processing rules for data element values (DV), comprises storing the one or more protection attributes stating processing rules for data element values (DV) as data element value data in the data element protection catalogue (DPC).*

*21. The method as set forth in claim 20, wherein the storing of the data element type data and the data element value data in the data element protection catalogue (DPC), comprises storing data element type data and its corresponding data element value data in rows in the data element protection catalogue (DPC).*

*22. The method as set forth in claim 21, wherein the storing of the data element type data and the data element value data in the data element protection catalogue (DPC), comprises storing data element type data and its corresponding data element value data in different rows in the data element protection catalogue (DPC).*

*23. The method as set forth in claim 22, wherein the data element type data and its corresponding data element value data are stored in respective fields in the rows.*

*24. The method as set forth in claim 23, wherein each row comprises one field containing one of the data element type data and other fields containing its one or more protection attributes.*

*25. The method as set forth in claim 24, further comprises adding a new data element type data (DT) in a new field in a new row in the data protection catalogue (DPC) and adding new data element value data of one or more protection attributes stating processing rules type data in other new fields of the new row and linking at least one of the data element value in the first database to the new data element type (DT) in the data protection catalogue (DPC).*

*26. The method as set forth in claim 25, wherein the initially producing a calling to the data element protection catalogue for collecting the protection attribute/attributes associated with the corresponding data element type, comprises reading at least a portion of the row of the data protection catalogue (DPC) containing the corresponding data element type (DT) to collect the protection attributes/attributes associated with the corresponding data element value (DV).*

*27. The method as set forth in claim 1, wherein the collecting the protection attributes/attributes associated with the corresponding data element value (DV) occurs for every user-initiated measure.*

*28. The method as set forth in claim 27, wherein the collecting the protection attributes/attributes associated with the corresponding data element value (DV) occurs for every user and is not based upon an identity of the user who initiated the measure.*

*29. The method as set forth in claim 1, wherein the database protection catalogue is inaccessible to a user.*

*30. The method as set forth in claim 1, wherein the database protection catalogue is physically separate from the first database.*

*31. The method as set forth in claim 1, wherein the database protection catalogue is physically separate from the first database and is inaccessible to a user.*

*32. The method as set forth in claim 1, further comprising storing the first database and the database protection catalogue in different cities.*

*33. The method as set forth in claim 1, further comprising importing a copy of the database protection catalogue into a third database separate from the second database.*

*34. The method as set forth in claim 33, further comprising storing the copy of the imported database protection catalogue in the same physical file storage facility as the first database.*

*35. The method as set forth in claim 33, further comprising storing the imported copy of the database protection catalogue and first database in different cities.*

*36. The apparatus as set forth in claim 8, wherein the records include the encrypted data element values (DV) and at least one unencrypted data element value.*

37. The apparatus as set forth in claim 8, wherein the data element protection catalogue (DPC) containing each individual data element type (DT), comprises storing each individual data element type (DT) as data element type data in the data element protection catalogue (DPC).

38. The apparatus as set forth in claim 37, wherein the data element protection catalogue (DPC) containing the one or more protection attributes stating processing rules for data element values (DV), comprises storing the one or more protection attributes stating processing rules for data element values (DV) as data element value data in the data element protection catalogue (DPC).

39. The apparatus as set forth in claim 38, wherein the storing of the data element type data and the data element value in the data element protection catalogue (DPC), comprises storing the data element type data and its corresponding data element value data in rows in the data element protection catalogue (DPC).

40. The apparatus as set forth in claim 39, wherein the storing of the data element type data and the data element value in the data element protection catalogue (DPC), comprises storing the data element type data and its corresponding data element value data in different rows in the data element protection catalogue (DPC).

41. The apparatus as set forth in claim 40, wherein the data element type data and its corresponding data element value data are stored in respective fields in the rows.

42. The apparatus as set forth in claim 41, wherein each row comprises one field containing one of the data element type data and other fields containing its one or more protection attributes.

43. The apparatus as set forth in claim 42, further comprises adding a new data element type data (DT) in a new field in a new row in the data protection catalogue (DPC) and adding new data element value data of one or more protection attributes stating processing rules for that data element value (DV) associated with the new data element type (DT) as data element type data in order new fields of the new row and linking at least one of the data element value in the first database to the new data element type (DT) in the data protection catalogue (DPC).

44. The apparatus as set forth in claim 43, wherein the initially producing a calling to the data element protection catalogue for collecting the protection attribute/attributes associated with the corresponding data element type, comprises reading at least a portion of the row of the data protection catalogue (DPC) containing the corresponding data element type (DT) to collect the protection attributes/attributes associated with the corresponding data element value (DV).

45. The apparatus as set forth in claim 8, wherein the collecting the protection attributes/attributes associated with the corresponding data element value (DV) occurs for every user-initiated measure.

46. The apparatus as set forth in claim 45, wherein the collecting the protection attributes/attributes associated with the corresponding data element value (DV) occurs for every user and is not based upon an identity of the user who initiated the measure.

47. The apparatus as set forth in claim 8, wherein the database protection catalogue is inaccessible to a user.

48. The apparatus as set forth in claim 8, wherein the database protection catalogue is physically separate from the first database.

49. The apparatus as set forth in claim 8, wherein the database protection catalogue is physically separate from the first database and is inaccessible to a user.

50. The apparatus as set forth in claim 8, further comprising storing the first database and the database protection catalogue in different cities.

51. The apparatus as set forth in claim 8, further comprising importing a copy of the database protection catalogue into a third database separate from the second database.

52. The apparatus as set forth in claim 51, further comprising storing the copy of the imported database protection catalogue in the same physical file storage facility as the first database.

53. The apparatus as set forth in claim 51, further comprising storing the imported copy of the database protection catalogue and the first database in different cities.

* * * * *